United States Patent Office 2,815,383
Patented Dec. 3, 1957

2,815,383
CONVERSION OF 1,8-p-MENTHADIENE-3-OL TO ACYCLIC COMPOUNDS

Albert B. Booth and Eugene A. Klein, Jacksonville, Fla., assignors to The Glidden Company, Cleveland, Ohio, a corporation of Ohio No Drawing. Application October 30, 1953, Serial No. 389,470

3 Claims. (Cl. 260—601)

The present invention is concerned with the treatment of 1,8-p-menthadiene-3-ol. It is particularly concerned with the conversion of this alcohol to useful acyclic compounds.

Citral is a major constituent of lemongrass oil and as such has considerable economic importance. The citral, so derived, is costly and is subject to a wide variation in price. Commercially, the lemongrass oil is obtained from foreign sources, which fact renders its supply rather uncertain.

There is no good commercial source of isocitral, which, together with citral, is a valuable odor and flavor chemical. More important is their use as synthetic intermediates in the production of pseudoionone, α-ionone, β-ionone and vitamin A. Therefore, this invention is unique in that it provides the first commercial synthetic source of intermediates for these vital compounds from readily available raw materials.

1,8-p-menthadiene-3-ol is readily produced from verbenol according to the teachings of copending application Serial No. 348,825, filed April 14, 1953. The verbenol can be produced readily by oxidation of α-pinene, as is known. Thus, the use of the afore-mentioned menthadienol as a raw material for the production of citral, and isocitral would be highly desirable.

It is accordingly an object of the present invention to provide a process for producing citral.

A further object is to provide a process for producing isocitral.

Another object is to provide an improved process for producing pseudoionone.

An additional object of the present invention is to provide a process for treating 1,8-p-menthadiene-3-ol to produce intermediates useful in the manufacture of vitamin A, as well as other useful products.

Still another object is to provide a new process for making valuable terpene compounds.

Other objects will be apparent to those skilled in the art.

We have found that 1,8-p-menthadiene-3-ol can be pyrolyzed to yield isocitral and citral. The pyrolysis can be conducted in liquid or vapor phase. It has been found that 1,8-p-menthadiene-3-ol decomposes at relatively low temperatures. For example, the pyrolysis can be conducted by heating the alcohol under 150 mm. absolute pressure and permitting it and its decomposition products to distill slowly. More rapid decomposition takes place by heating at atmospheric or superatmospheric pressure. As shown in the examples, it is quite convenient to employ higher temperatures and the vapor phase. It will be appreciated that higher temperatures and shorter contact times can be employed if desired. The pyrolysis need not be complete and in general we find it convenient to secure only partial, though substantial, conversion of the alcohol to the carbonyl compounds, then separate the unreacted alcohol by physical or chemical means and recycle it to a subsequent pyrolysis.

Equation 1 shows the products resulting from the pyrolysis of this menthadienol and also certain reactions which can be carried out on the pyrolysate.

EQUATION 1

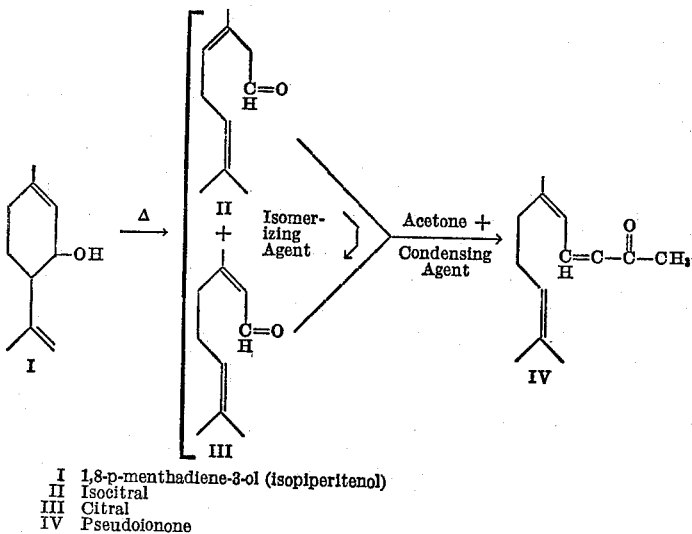

I 1,8-p-menthadiene-3-ol (isopiperitenol)
II Isocitral
III Citral
IV Pseudoionone The pyrolysate can be worked up in several ways depending upon the products desired. Direct fractionation yields isocitral and citral. If only citral is desired, the pyrolysate can be treated with alkali to isomerize the isocitral to citral. A sulfite extraction process can be used to separate the carbonyl material from the unchanged alcohol. The residual oil from the latter process contains the unchanged alcohol which can be processed to produce additional quantities of the pyrolysis products. Reaction of the pyrolysate with acetone in the presence of a condensing agent yields pseudoionone, which is a vitamin A intermediate. The pseudoionone originates from the isocitral and citral in the pyrolysate. Some hydrolysis of citral may take place during the working up of the pyrolysis products by chemical means so that some 2-methyl-2-heptene-6-one is produced (methyl heptenone). This low boiling product is readily separated on distillation. Citral and isocitral each is capable of existence in two stereo forms. The stereo forms of citral are sometimes referred to as citral-A and citral-B, but since they are separable only with difficulty, they are ordinarily employed in such admixtures in which they may occur. Isocitral, as is known, can be obtained from the enol acetate of citral but in low yields.

Citral is used widely in the flavor and perfumery industries and to a greater extent as an intermediate in the synthesis of vitamin A, by way of $\psi$- and $\beta$-ionone. $\alpha$- and $\beta$-ionone and methyl ionones, in turn, are widely used in perfumes, cosmetics and the scenting of soaps because of their intense violet-like odor.

Isocitral is reported to be a constituent of lemon oil. This isocitral is valued highly for the preparation of expensive perfumes due to the freshness of the lemon odor which it imparts and which is not associated with the conjugated citrals. As is shown in the examples below, isocitral can be obtained in good yield by the pyrolysis of 1,8-p-menthadiene-3-ol, and if the other above-mentioned products are desired, they, too, can be obtained from the 1,8-p-menthadiene-3-ol pyrolysate by procedures outlined above and given in the examples.

An important feature of this invention is that 1,8-p-menthadiene-3-ol from any source will give the same products, because they are all optically inactive.

The following examples are illustrative:

*Example 1*

Pure isopiperitenol (1,8-p-menthadiene-3-ol) was pyrolyzed by adding the liquid dropwise at 2–3 cc. per minute down the side of a heated, vertical ¼-inch standard iron pipe. The temperature, 390–415° C., was determined from a thermocouple inserted down the center of the pipe. An infrared spectrum of the pyrolysate showed about 35% unchanged isopiperitenol and also conjugated and non-conjugated carbonyl compounds. An ultraviolet spectrum on the same material showed a $\lambda_{max}$ at 230 m$\mu$ and a specific extinction coefficient $$\alpha = E_{1\,cm.}^{t.fl.}$$

of about 40 (isooctane). This ultraviolet data corresponds to about 35% citral, but as will be shown below, other compounds are present having a similar spectrum, because only 11% citral was isolated.

The pyrolysate, 285 g., was fractionated through an efficient column packed with stainless steel protruded packing. Fourteen fractions were collected, ranging in size from 1.5 to 21.5 grams. The boiling points ranged from 38.5° C. at 1.5 mm. to 57.5° C. at 0.5 mm. Infrared and ultraviolet spectra were made for most of the fractions and these showed the number of major compounds as well as their structural features. Citral and isopiperitenol were identified by comparison of the infrared and ultraviolet spectra of the fractions containing them with the spectra of known samples of the compounds. Isocitral, which has a "soapy lemon" odor was identified by converting it to citral. The conversion was accomplished by heating with stirring, the oil and a saturated sodium carbonate solution at 90–95° C. for about six hours.

A summary of the fractionation and spectral data showed the following approximate yields of products:

|  | Grams | Percent |
|---|---|---|
| Unchanged isopiperitenol | 90 | 32 |
| Isocitral | 99 | 35 |
| Citral | 30 | 11 |
| Non-volatile residue | 24 | 8.5 |
| Loss | 42 | 13.5 |
| Total | 285 | 100.0 |

The loss was presumably due to low boiling hydrocarbon and carbonyl pyrolytic cleavage fragments. Some of the carbonyl fragments were assumed to have a similar ultraviolet absorption maximum to citral, since the first calculation of citral in the crude pyrolysate from the ultraviolet absorption of the crude pyrolysate indicated more of the conjugated form of citral than was actually obtained.

*Example 2*

Pure isopiperitenol was pyrolyzed as described in Example 1. An infrared spectrogram of the pyrolysate showed 40–45% unchanged isopiperitenol and conjugated and non-conjugated carbonyl compounds. The carbonyl compounds totaled about 50% as determined by titration with hydroxylamine solution.

The pyrolysate had a strong lemon odor.

300 g. of the pyrolysate was added with stirring to a solution containing 190 cc. of acetone, 300 cc. of water and 7.5 g. of sodium hydroxide. The mixture was stirred at 25–30° C. for 24 hours at the end of which time 500 cc. of water was added and the layers separated. The aqueous phase was extracted with light naphtha. The combined organic material was washed with a saturated sodium bicarbonate solution, dried with anhydrous sodium sulfate and then distilled.

The naphtha was removed at about 130 mm. and the residue fractionated at 10 mm. through a short column packed with glass helices. Eleven fractions were collected and these ranged in size from 17 to 31 grams. Infrared and ultraviolet spectrograms were made for most of the fractions and these showed the number of major compounds, as well as their structural features. The following compounds were found to be present in the order of their increasing boiling points:

A. 2-methyl-2-heptene-6-one was present in the fraction boiling at 59–91° C. at 10 mm. Identification was made from its characteristic odor and also by comparison of the infrared spectrogram of the fraction with the infrared spectrogram of a standard sample of 2-methyl-2-heptene-6-one.

B. Isocitral was present in the fractions boiling 91–98° C. at 10 mm. Identification was made from its characteristic "soapy lemon" odor and also by comparison of the infrared spectrogram of a known sample with the infrared spectrogram of the fractions in the above boiling range.

C. Isopiperitenol was the major product boiling 98.5–99° C. at 10 mm. Identification was made by comparison with an infrared standard spectogram.

D. Citral was present in the fractions boiling 98.5–101° C. at 10 mm. Identification was made from its characteristic lemon odor and comparison with standard infrared and ultraviolet spectrograms.

E. Pseudoionone was the major product boiling 134–139° C. at 10 mm. Identification was made from its characteristic "haylike" odor and comparison with standard infrared and ultraviolet spectra. The pseudoionone was further identified by cyclizing it with phosphoric acid in the known manner to $\alpha$-ionone. The $\alpha$-ionone was identified by its characteristic violet odor and by comparison of its infrared spectrogram with that of an authentic sample.

A summary of the fractionation and spectral data showed the total reaction product to be composed of the following approximate weights of products:

|  | G. |
|---|---|
| Unchanged isopiperitenol | 140 |
| 2-methyl-2-heptene-7-one | 3 |
| Isocitral | 21 |
| Citral | 42 |
| Pseudoionone | 73 |
| Non-volatile residue | 26 |
| Total | 305 |

*Example 3*

290 g. of the pyrolysate described in Example 2 was heated with efficient stirring at 90–95° C. for 6½ hours with 250 cc. of a saturated sodium carbonate solution. The oil was washed with a saturated sodium bicarbonate solution and then distilled.

The oil was fractionated through an efficient column packed with stainless steel protruded packing. Ten fractions were collected, ranging in boiling point from 55°

C. at 1.8 mm. to 57° C. at 0.6 mm. Infrared and ultraviolet spectrograms were made for most of the fractions and these showed the major products to be isocitral, isopiperitenol and citral. A summary of the distillation and spectral data showed the crude treated pyrolysate to have the following approximate composition:

|  | Grams | Percent |
|---|---|---|
| Isopiperitenol | 133 | 46 |
| Isocitral | 58 | 20 |
| Citral | 58 | 20 |
| Non-volatile residue | 21 | 7 |
| Loss | 20 | 7 |
| Total | 290 | 100 |

The loss was attributed to low boiling pyrolytic cleavage fragments.

Example 4

Pure isopiperitenol was pyrolyzed as described in Example 1, except that the temperature was maintained at 450–470° C. An infrared spectrum of the resulting pyrolysate showed about 15% alcohol and conjugated and non-conjugated carbonyl compounds.

The isopiperitenol, 1,8-p-menthadiene-3-ol, referred to herein, and its preparation is described and claimed in application Serial No. 348,825, filed April 14, 1953.

Having described the invention, what is claimed is:

1. The process which comprises pyrolyzing 1,8-p-menthadiene-3-ol, treating the pyrolysis mixture with an alkaline reagent, and recovering from the pyrolysis mixture fractions comprising essentially citral, isocitral and 1,8-p-menthadiene-3-ol.

2. The process for producing citral and isocitral which comprises pyrolyzing 1,8-p-menthadiene-3-ol by heating the same until the resulting mixture contains a substantial quantity of acyclic aldehydes of the empirical formula $C_{10}H_{16}O$.

3. The process which comprises pyrolyzing 1,8-p-menthadiene-3-ol by heating the same until the resulting mixture contains a substantial quantity of acyclic aldehydes of the empirical formula $C_{10}H_{16}O$, and recovering fractions comprising essentially citral, isocitral and 1,8-p-menthadiene-3-ol from said mixture.

References Cited in the file of this patent

FOREIGN PATENTS 8,736    Great Britain _____ Feb. 24, 1894

OTHER REFERENCES

Grignard et al.: Compt. rend. 190, 1164–7 (1930.)
Schimmel & Co., "Annual Report on Essential Oils, Synthetic Perfumes, etc., 1932 ed., pgs. 80 and 81.
Fieser et al.: "Org. Chem.," 2nd ed. 1950, pgs. 584–5.
Chem. Abstracts 44 10265a (1950).